Figure 1:
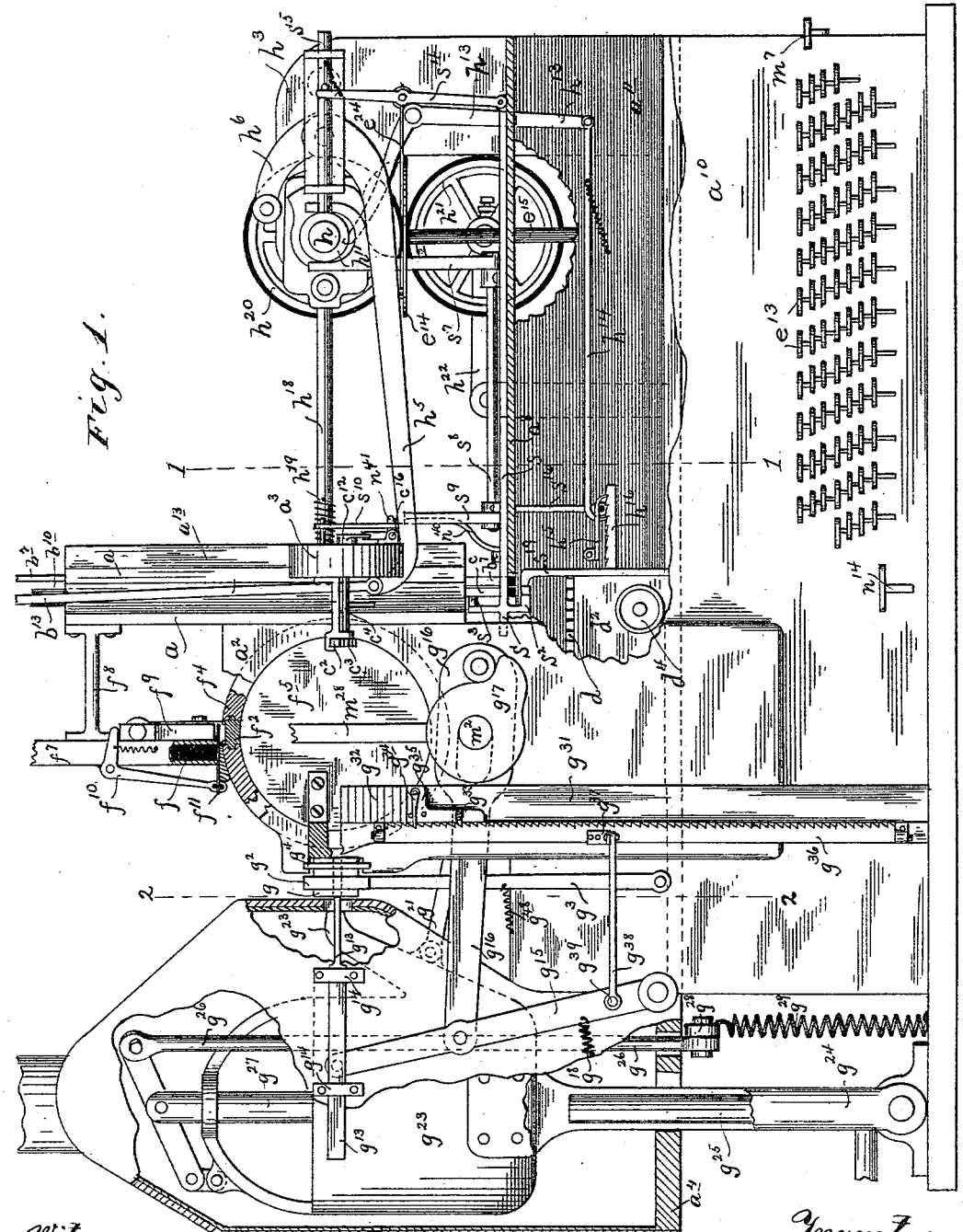

(No Model.) 7 Sheets—Sheet 1.

F. A. JOHNSON.
MATRIX MAKING AND STEREOTYPING MACHINE.

No. 463,388. Patented Nov. 17, 1891.

Witnesses
A. H. Opsahl.
E. F. Elmore.

Inventor.
Frank Ames Johnson
By his Attorney.
Jas. F. Williamson (No Model.) 7 Sheets—Sheet 2.

F. A. JOHNSON.
MATRIX MAKING AND STEREOTYPING MACHINE.

No. 463,388. Patented Nov. 17, 1891.

Witnesses
A. H. Opsahl.
E. F. Elmore.

Inventor.
Frank Amos Johnson
By his Attorney
Jas. P. Williamson

THE NORRIS PETERS CO., PHOTO-LITHO., WASHINGTON, D. C.

(No Model.) 7 Sheets—Sheet 3.

F. A. JOHNSON.
MATRIX MAKING AND STEREOTYPING MACHINE.

No. 463,388. Patented Nov. 17, 1891.

Witnesses.
A. H. Opsahl.
E. F. Elmore.

Inventor.
Frank Ames Johnson
By his Attorney
Jas. F. Williamson (No Model.)  7 Sheets—Sheet 4.

F. A. JOHNSON.
MATRIX MAKING AND STEREOTYPING MACHINE.

No. 463,388. Patented Nov. 17, 1891.

Witnesses.
A. H. Opsahl.
E. F. Elmore.

Inventor.
Frank Amos Johnson
By his Attorney.
Jas. F. Williamson (No Model.) 7 Sheets—Sheet 5.
F. A. JOHNSON.
MATRIX MAKING AND STEREOTYPING MACHINE.

No. 463,388. Patented Nov. 17, 1891.

Witnesses
A. H. Opsahl.
E. F. Elmore.

Inventor.
Frank Amos Johnson
By his Attorney.
Jas. P. Williamson (No Model.)
F. A. JOHNSON.
MATRIX MAKING AND STEREOTYPING MACHINE.
No. 463,388. Patented Nov. 17, 1891.
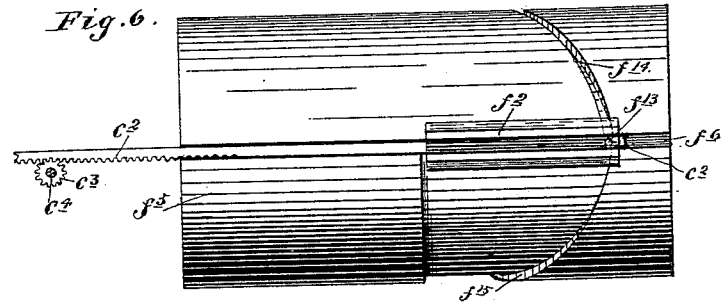
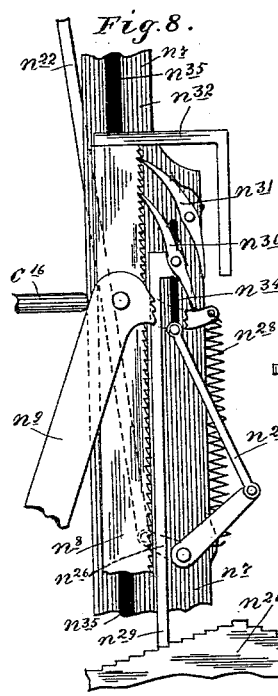
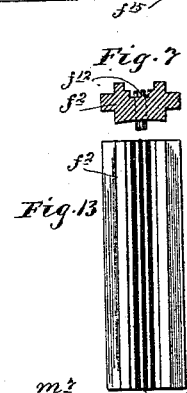
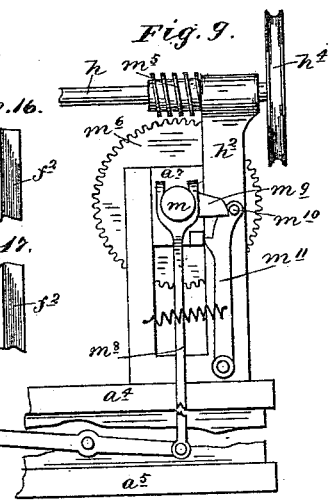
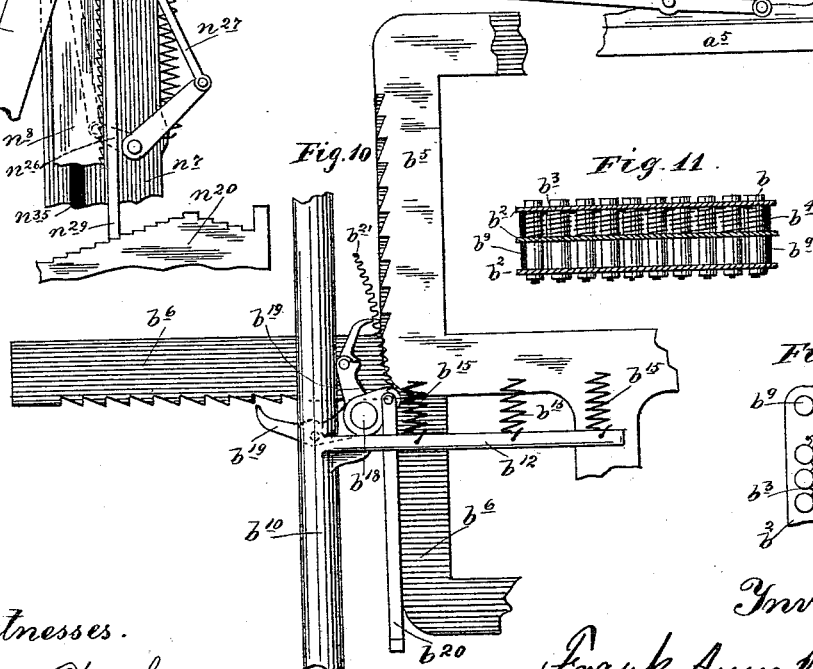
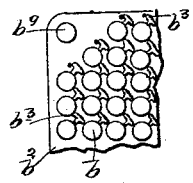
Witnesses.
A. H. Opsahl.
E. F. Elmore.
Inventor.
Frank Amos Johnson
By his Attorney.
Jas. F. Williamson (No Model.) 7 Sheets—Sheet 7.

F. A. JOHNSON.
MATRIX MAKING AND STEREOTYPING MACHINE.

No. 463,388. Patented Nov. 17, 1891.

UNITED STATES PATENT OFFICE.

FRANK AMOS JOHNSON, OF MINNEAPOLIS, MINNESOTA, ASSIGNOR TO THE TACHYTYPE MANUFACTURING COMPANY, OF SAME PLACE.

MATRIX-MAKING AND STEREOTYPING MACHINE.

SPECIFICATION forming part of Letters Patent No. 463,388, dated November 17, 1891.

Application filed April 27, 1891. Serial No. 390,564. (No model.)

*To all whom it may concern:*

Be it known that I, FRANK AMOS JOHNSON, a citizen of the United States, residing at Minneapolis, in the county of Hennepin and State of Minnesota, have invented certain new and useful Improvements in Matrix-Making and Stereotyping Machines; and I do hereby declare the following to be a full, clear, and exact description of the invention, such as will enable others skilled in the art to which it appertains to make and use the same.

My invention relates especially to that class of matrix-making machines in which the impressions are made in the matrix material, a single character or die at a time. Machines of this class are generally operated by a single key or a bank of keys, each stroke or movement of a key bringing the proper die to the impression-point, driving the punch into the matrix material, and moving the matrix along, so that the letters will occupy their proper space in the line. In order that the normal spaces between words may be increased or diminished to make the lines of uniform length, the amount of space which the characters and normal spaces will occupy in the line has to be predetermined. This is usually done by running the matter through on a type-writer having a suitable registering device attached. The space required for the characters in the line, together with the proper spacing between words, is called the "letter-space." It is about as much work to predetermine the letter-space required as it is to make the matrix after the letter-space has been determined.

One of the chief features of my invention is to overcome this difficulty in a new and simple way. Instead of having the dies aligned and the impressions made of them directly as the keys are struck, I use the bank of keys to set up or arrange a dummy or mechanical line composed of a series of independently-movable actuating or die-selecting pieces arranged in sets. Each set in the series may be made to correspond to a character in the bank of dies, and there are as many sets as there are letters in a line, a maximum number being provided for. These pieces may be used as stops, as hereinafter described, or in any other convenient manner. I provide a suitable matrix-making mechanism, which is operated automatically and entirely independent of the bank of keys. The movements of this matrix-making mechanism are controlled by this mechanical line, causing it to bring the proper dies to the impression-point, make the impressions in the matrix material, and give the proper feed to the matrix-holder. By a suitable feed device the various sets of pieces in the mechanical line are caused to act upon or control the matrix-making mechanism successively, so that by properly arranging the sets in the series the dies may be impressed in any desired order. The amount of line-space being ascertained by the same act which sets up the dummy line, one operation is saved, and the particular actuating-pieces which are to cause the matrix material to be fed along and effect the spacing may therefore be changed, increasing or decreasing the normal space-feed sufficiently to properly space or justify the line, or the matrix-feed can be changed in any other suitable way to effect the same result.

Furthermore, my invention consists of a primary series of setting-slides controlled directly by the bank of keys, whose settings are transferred to the parts of the mechanical line. The primary slides are immediately returned to their normal position and may be arranged for a succeeding line while the traveling series of actuating-stops constituting the dummy line is effecting the selection and impression of the dies for the previous line, thereby greatly increasing the speed of the machine. The matrix-machine proper is run in conjunction with a casting mechanism and a stereotype is made of each line before leaving the machine. The product of the machine is therefore ready to be locked up in a chase like ordinary type. By holding the matrix material in separate holders and providing three or four of them a cast or stereotype is taken from one line while new material is being placed in a second holder and the impressions are being made in the third holder and while the primary setting-slides are being set for the next succeeding line. These operations being carried on simultaneously, the delay or amount of time which must elapse after one line has been set before beginning on the next one is reduced to a minimum and the greatest possible speed attained thereby. These, together with other improvements, are described in detail in the following specification.

Figure 2:
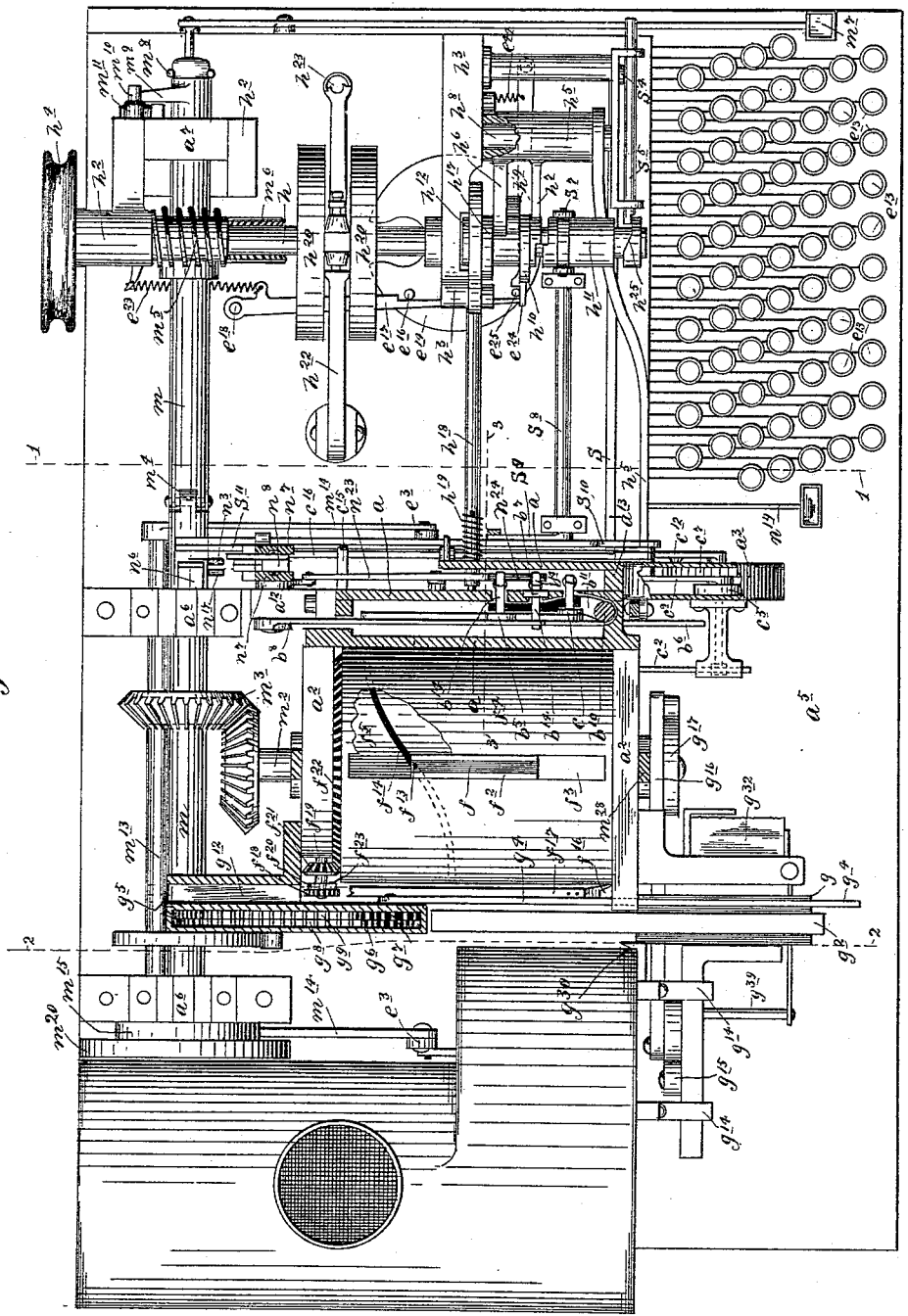
Figure 3:
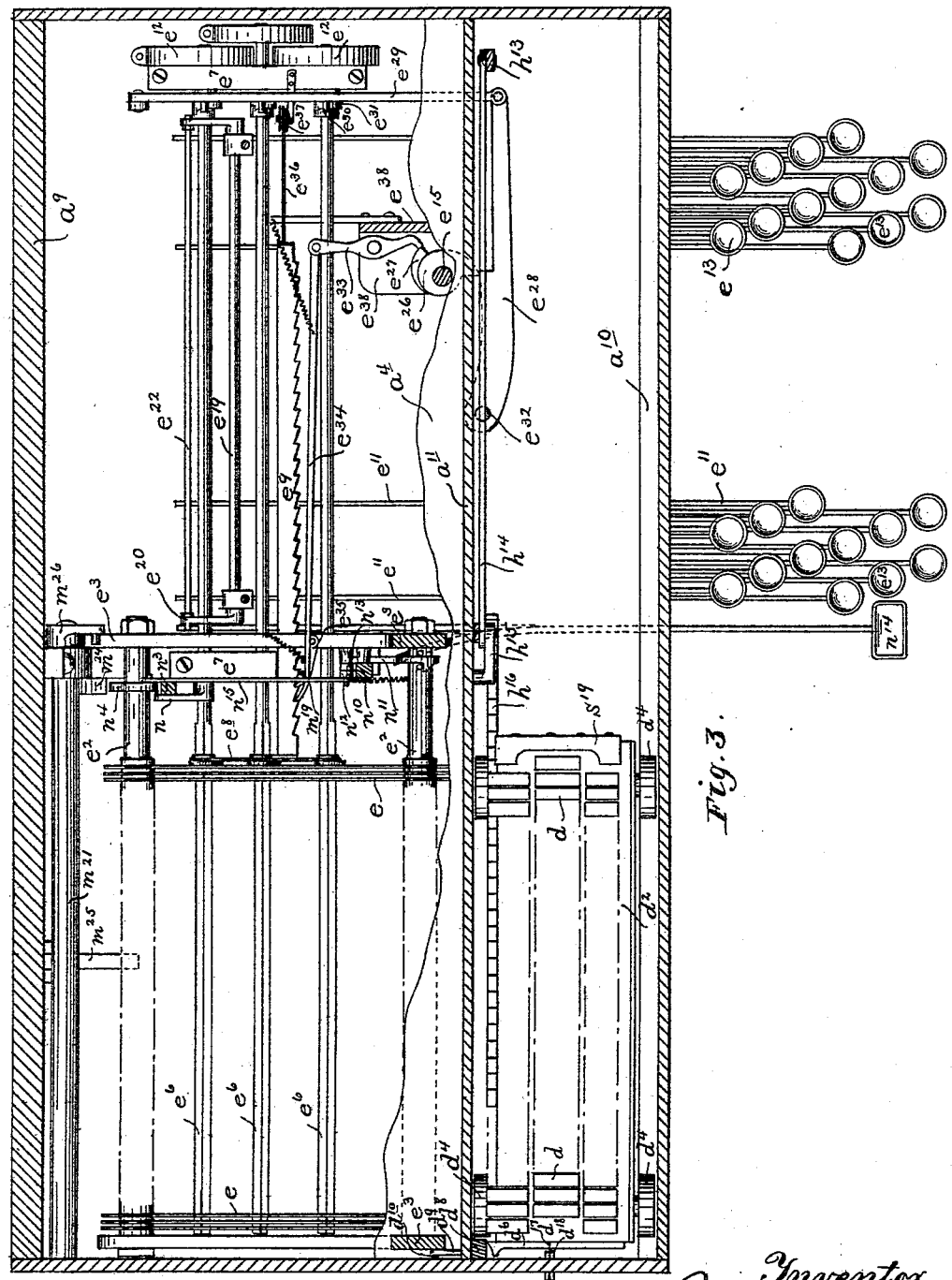
Figure 4:
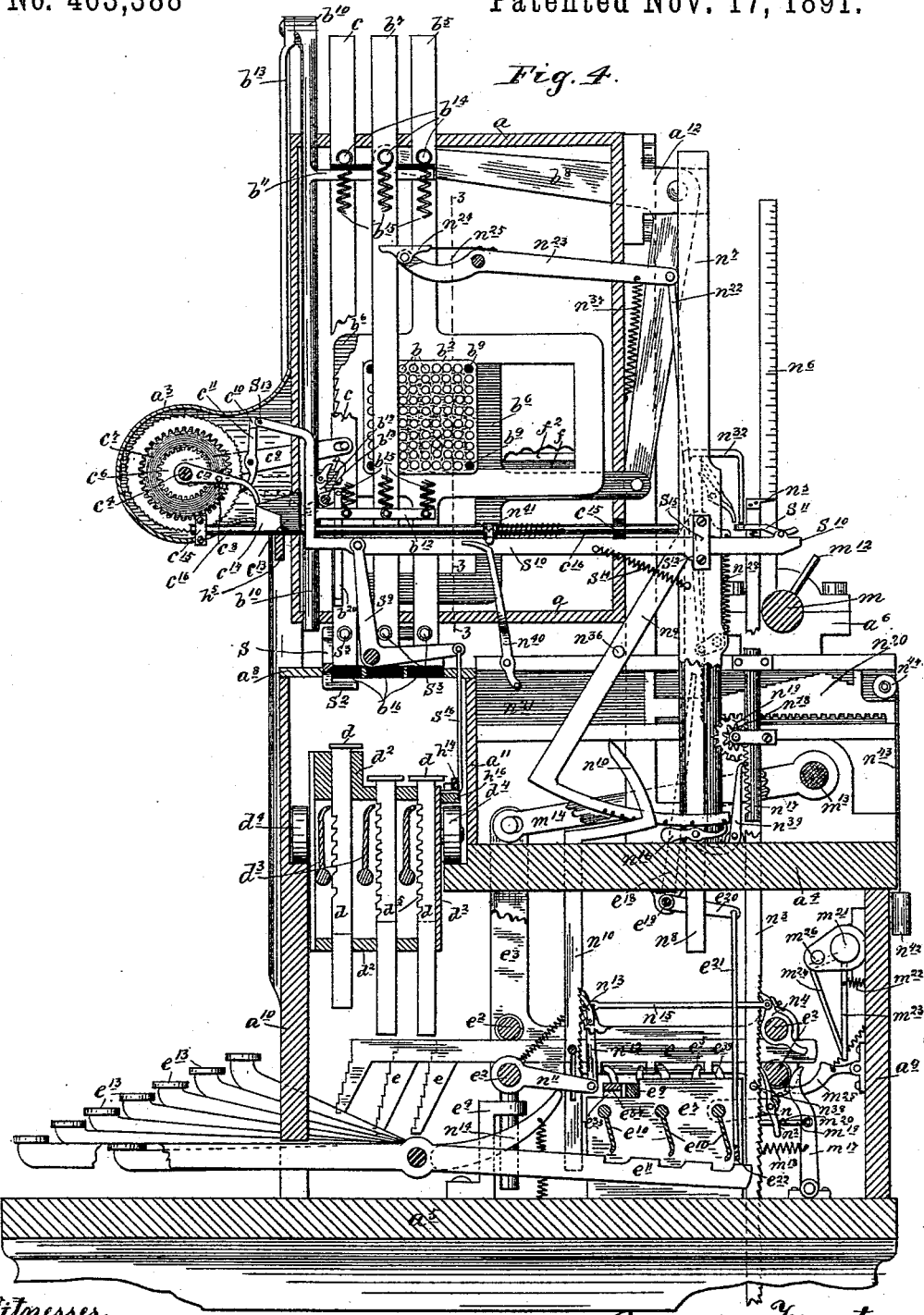
Figure 5:
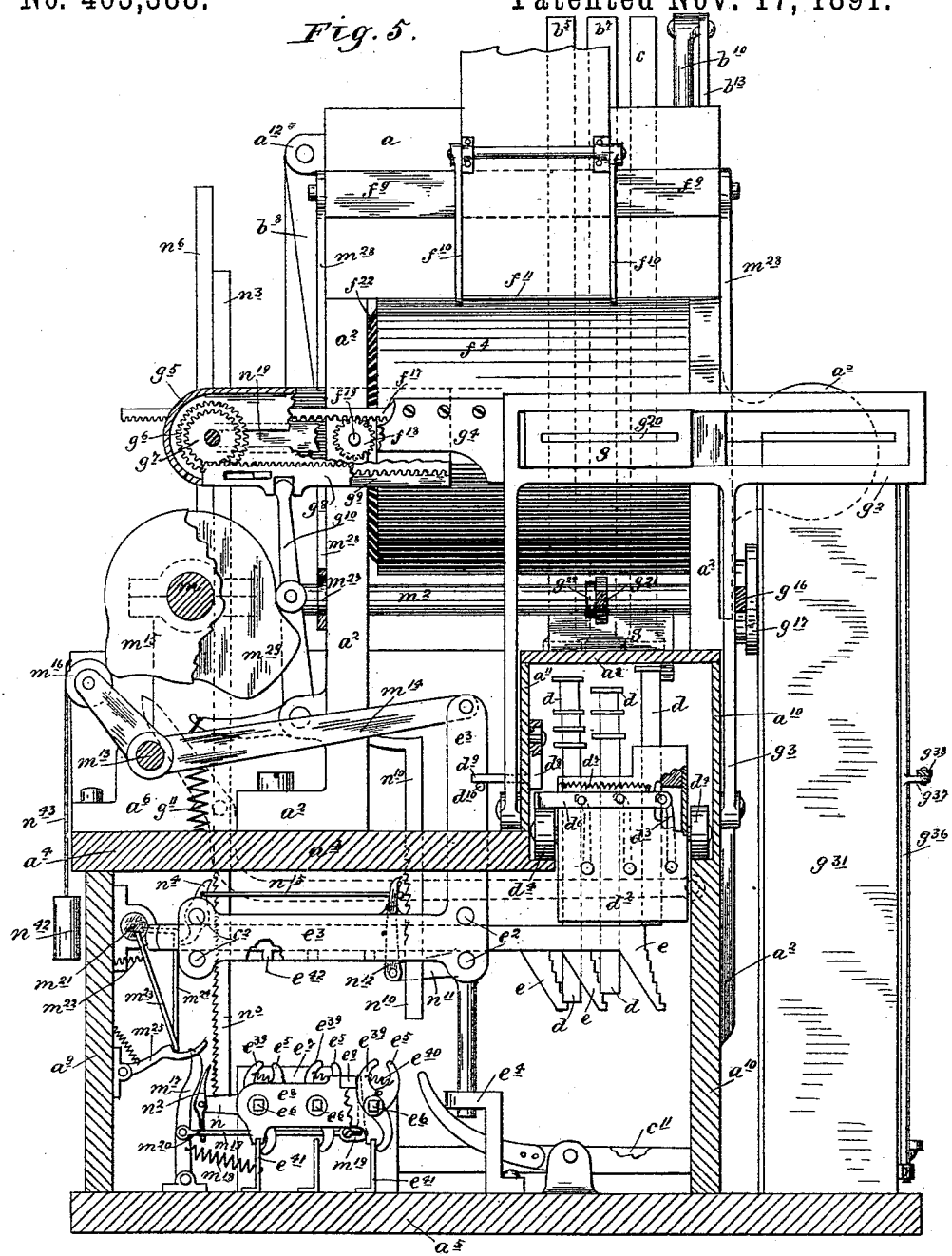
Figure 18:
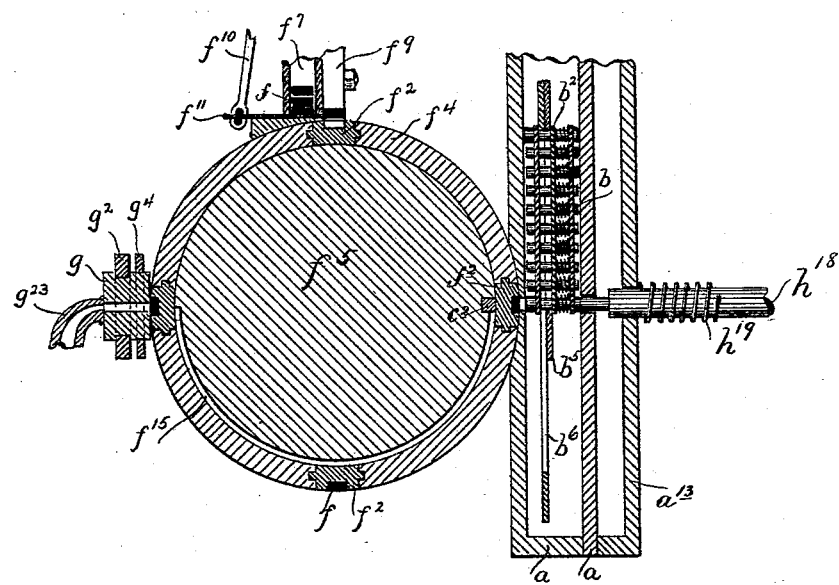

Referring to the accompanying drawings, Figure 1 is a front elevation. The terms "right," "left," "front," and "rear," unless otherwise specified, are applied to the machine as they appear in this view. Fig. 2 is a top or plan view. Fig. 3 is a top view chiefly of the setting mechanism. Fig. 4 is a view looking toward the left of a section about on a line 1 1 of Figs. 1 and 2, much of the frame-work, however, being removed, in order that the relation of the various parts may be more clearly shown. Fig. 5 is a view looking toward the right of a section about on the line 2 2 of Figs. 1 and 2. Fig. 6 is a detail of the cylinder on which the matrix-carrying drum turns. Fig. 8 is a detail of the toggle-joint which operates the spacing or justifying device. Fig. 9 is a detail of the start and stop device. Fig. 10 is a detail of the aligning device. Figs. 11 and 12 are details of the dies and their holder. Figs. 7, 13, 14, 15, 16, and 17 are details of the matrix material and holders. Fig. 18 is a section about on line 3 3 of Figs. 2 and 4.

In the machine shown I employ a set of male dies or punches $b$, which are held by three plates $b^2$. Suitable pins or projections $b^3$, coming in contact with the adjacent dies, as shown in Fig. 12, prevent the dies from turning, and also serve as bearings for springs $b^4$, which hold the dies in their normal position. I have shown ten rows of dies with ten in each row. Any convenient number desired may be used, there being one punch or die for each character the machine is to produce. The dies in the corners are removed and rivets $b^9$ are inserted to hold the plates $b^2$ together. Two dies adjacent to one corner are left out, for purposes which will hereinafter appear. The plates $b^2$, which are securely fastened together, will be referred to as the "die-holder." This die-holder is inclosed in two oblong frames $b^5$ and $b^6$, as shown in Fig. 4, permitting the holder to have a universal movement. One of these holders $b^6$ moves horizontally and the other vertically, and they are held and guided in a box $a$, which stands in a vertical position, suitable projecting arms of the frames $b^5$ and $b^6$ being guided through slots or mortises in the edges of the box $a$.

Working through the top and bottom of the box $a$ is a sliding bar $b^{10}$, moved by power applied to a connecting-rod $b^{13}$. This rod $b^{10}$ has two projecting arms $b^{11}$ and $b^{12}$. To the lower arm $b^{12}$ are attached three springs $b^{15}$, the upper ends of which are fastened to pins $b^{14}$, one of which is in frame $b^5$, the second in the sliding piece $b^7$, which controls through a bell-crank lever $b^8$ the movement of the horizontal frame $b^6$, and the third is attached to a sliding bar $c$, which will be referred to later. The upper arm $b^{11}$ is arranged to strike against the pins $b^{14}$ in its upward movement, restoring them to position shown in Fig. 4. It is evident from this construction that by drawing down the frame $b^5$ and sliding bar $b^7$ any one of ten distances any die in the holder may be brought opposite the position occupied by the lower rear rivet $b^9$ of the die-holder when said holder is in its normal position, as shown in Fig. 4. At this point the selected and aligned dies are driven into the matrix material, and it will be hereinafter referred to as the "impression-point."

Directly under the pieces which slide vertically through box $a$ I arrange the mechanical line previously referred to, consisting of three rows of stops $d$, held in a suitable traveling frame composed of parts $d^2$, which is mounted on wheels $d^4$. The rear row of stops $d$ may be set in any one of ten positions and is adapted to stop the vertically-sliding frame $b^5$, so as to bring any one of the ten horizontal rows of dies in line with the impression-point. Likewise the middle row of stops $d$ may be set in any one of ten positions to arrest the movement of sliding piece $b^7$, thereby bringing to the impression-point any one of the ten dies of the row selected. The front row of stops $d$ arrests the movements of sliding bar $c$ and may be set in any desired position to secure, through mechanism to be hereinafter described, the proper feed of the matrix material corresponding to the selected die. The sliding bar $b^{10}$ is drawn down to its lowest position with each revolution of the power-shaft; but the frames controlling the die-holder, being yieldingly attached to said bar by springs $b^{15}$, permit said frames being stopped in any desired position by the stops $d$. The stops $d$ are held in the positions set by locking-plates $d^3$, entering notches $d^5$ in said stops.

*Matrix-making mechanism.*—The matrix-making mechanism is operated by a constantly-running power-shaft $h$, driven by power applied to pulley $h^4$ and held in suitable bearings $h^2$ and $h^3$. With each revolution of the power-shaft the sliding bar $b^{10}$ is drawn down, the selected die brought to the impression-point and aligned, the matrix material fed the proper distance, the die driven into it, making the impression or matrix, the bar $b^{10}$ raised, restoring the dies to normal position, and the mechanical-line stops fed one step to bring the next succeeding set of stops where they will be acted upon. The sliding bar $b^{10}$ is operated through connecting-rod $b^{13}$, already referred to, by an oscillating lever $h^5$, mounted on a stud $h^8$ from bearing $h^3$, it being moved and controlled through arms $h^6$ and $h^7$ by corresponding cams $h^9$ and $h^{10}$. These cams are loose on shaft $h$ and made to turn with it only when a clutch $h^{11}$ is closed or thrown against them. Attached to the cams $h^9$ and $h^{10}$ are two other cams $h^{12}$ and $h^{17}$, likewise loose on shaft $h$. The cam $h^{12}$ acts on an angle-lever $h^{13}$, Fig. 1, and through a long pawl or hooked connecting-rod $h^{14}$, engaging a rack $h^{16}$, attached to the traveling frame $d^2$, feeds said frame one notch with each revolution of shaft $h$, it being held by a retaining-pawl $h^{15}$.

At the proper time a plunger $h^{18}$, guided on the bearing $h^3$ and passing through box $a$, Fig. 2, directly in front of the impression-point, is driven against the die, which is then opposite it, forcing it through an opening in the left side of the box $a$ into a suitable matrix material $f$, Figs. 4 and 18. The matrix material $f$ is held in suitable holders $f^2$. Four of these holders are provided, and they are held and adapted to move in horizontal slots $f^3$ of a drum $f^4$, which is held by and turns on a cylinder $f^5$, which is supported by front and rear bearings $a^2$. The holder at the right is close up to the left side of the box $a$, through which the impressions are made into the matrix material. The matrix material is fed or moved the proper distance by a rack $c^2$, which extends through a slot $f^6$ in the cylinder $f^5$, Fig. 6, and hooks around the end of the holder $f^2$, so as to pull it along. The rack $c^2$ is actuated by a pinion $c^3$ on a shaft $c^4$, which is turned by an internal gear and ratchet-wheel $c^7$ loose on shaft $c^4$, through an intermediate gear $c^8$, attached to an arm $c^{12}$ and in mesh with a gear $c^6$, rigid with shaft $c^4$. This ratchet-wheel is operated by a pawl $c^{10}$ on an arm $c^9$, pivoted to the sliding bar $c$, already referred to. A spring $c^5$, Fig. 2, tends constantly to turn the shaft $c^4$ in a direction to throw the rack $c^2$ to the rear. As the sliding bar $b^{10}$ is drawn down the matrix material will be moved through the mechanism just described the proper distance, according as the stops $d$ in the front or spacing row have been set. The stops having been set by means hereinafter described, the clutch $h^{11}$ is closed through clutch-lever $S^7$, operated through suitable connections from the movement-shaft, as hereinafter described. The cams on shaft $h$ are thereby caused to turn with said shaft. With each revolution the sliding bar $c$ $b^7$ and frame $b^5$ are thrown against one set of the pins $d$, bringing the desired die to the impression-point and feeding the matrix material the proper distance for that letter. While in this position the plunger $h^{18}$ drives the die in making an impression of the same in the matrix material. This requires, say, two-thirds of a revolution of the shaft $h$. During the last third of the revolution the die-holder is restored to normal position and the mechanical line is moved one notch, so that the next revolution may select a different character, if desired.

*Aligning device.*—The upper ends of the stops $d$ are made broad, and the parts striking against them have cushions $b^{16}$ to secure a large bunting-surface and overcome the momentum of the die-holder without making too much noise. By this arrangement an approximate alignment of the die only can be obtained. An aligning device is therefore provided (see Fig. 10) composed of a rocking shaft $b^{18}$, carrying two toggle-jointed levers $b^{19}$, which are operated by the last and excessive movement of the arm $b^{12}$, striking against the lower and hooked end of a depending leg $b^{20}$, thereby rocking shaft $b^{18}$ and throwing the outer ends of the toggle-levers $b^{19}$ into suitable notches in the frames $b^5$ and $b^6$ and carrying them backward a slight distance, thereby securing an accurate alignment of the die. A retracting-spring $b^{21}$ holds the toggle-levers out of the notches until forced in by the drawing down of the leg $b^{20}$.

*Setting mechanism.*—Extending from the rear under the mechanical line is the set of primary setting-slides $e$, previously referred to, whose settings are adapted to be transferred to the parts of the mechanical or dummy line, each stop $d$ having a corresponding slide $e$ to set it. These stepped slides $e$ are held in a suitable frame composed of four rods $e^2$ and two end pieces $e^3$. The frame is capable of a bodily vertical movement, it being guided by end pieces $e^3$, passing through mortises in the upper bed-plate $a^4$, and by angle-pieces $e^4$, attached to the lower bed-plate $a^5$. These two bed-plates may be said to constitute the main frame-work of the machine. It will be evident by referring to Fig. 4 that by withdrawing the slides $e$ suitable distances and raising the frame containing them the lower ends of the stops $d$ will come in contact with the stepped ends of the slides $e$ and be raised by them a greater or less distance, according as the slides $e$ are withdrawn.

The mechanism for setting or withdrawing the primary setting-slides $e$ is substantially the same as that shown for setting the stop-pins in an application for Letters Patent filed by me, of date September 15, 1890, under Serial No. 365,078, for a matrix-machine. It consists of a set of traveling or sliding crank-arms adapted to withdraw said slides and a corresponding set of rock-shafts, on which said crank-arms slide, actuated by power supplied by an intermittently-running shaft, which is turned by a friction-disk and called into action with each stroke of the key, the movements of said rock-shafts being limited by their bails or blades coming in contact with notches in the key-lever which has been called into action. These crank-arms $e^5$ act against lugs $e^{42}$ on the slides $e$. Their actuating rock-shafts $e^6$ extend nearly the whole length of the machine from right to left and are held in suitable bearings $e^7$ from the lower bed-plate $a^5$. The left portions of said shafts—the parts on which the crank-arms slide and which are under the slides $e$—are square, and their left ends are left free. The crank-arms are inclosed between two plates $e^8$, to which is attached a rack $e^9$, constituting a traveling slide-setting carriage, and by means of which the crank-arms $e^5$ are moved from one set of slides $e$ to the next. The shafts $e^6$ are kept constantly under tension by springs $e^{12}$, attached to the bed-plate $a^5$, and between the bearings $e^7$ each shaft is provided with a blade $e^{10}$. The key-levers $e^{11}$ extend backward under the blades of the rock-shafts and have suitable notches adapted to engage said blades and to limit the movement of the rock-shafts. As each key is depressed the shafts $e^6$ are released, and, being under tension from springs $e^{12}$, as hereinafter described, rock until their blades strike against the notches in the key-levers, thereby causing the crank-arms to draw three of the slides $e$ any desired distances, according as the rock-shafts are limited in their movements by the notches in the key-levers.

The rock-shafts are released in the following manner: The shaft $h$ has two friction-wheels $h^{20}$, rigid with said shaft. Directly under these are two similar wheels $h^{21}$, held against the upper wheels by a spring $h^{23}$ under the right-hand end of a lever $h^{22}$. (See Figs. 1 and 2.) A friction-disk $e^{14}$, having a cut-away portion, is fastened to the upper end of a vertical shaft $e^{15}$ and is located as shown in Fig. 1. By turning the disk $e^{14}$ slightly it will be caught between the constantly-revolving wheels $h^{20}$ and $h^{21}$ and given a complete revolution until the opening in the disk comes round again. Every time one of the keys $e^{13}$ is depressed the rear end of the key-lever is raised, carrying upward a common bar $e^{22}$, and through connections $e^{21}$ arms $e^{20}$ will rock a shaft $e^{19}$, which is supported in suitable bearings on the under side of upper bed-plate $a^4$. Attached to this shaft is an arm $e^{18}$, (shown in dotted-line position in Fig. 4,) the upper end of which has a tripping-piece $e^{17}$, adapted to strike against a pin $e^{16}$ in the friction-disk $e^{14}$ and turn it forward enough to throw said disk in between the wheels, as described, with each stroke of the key. The lever $e^{18}$ and piece $e^{17}$ are drawn backward by a retracting-spring $e^{23}$. The momentum of the disk $e^{14}$ is overcome and the disk prevented from catching between the wheels until the next key is struck by a pin $e^{25}$ coming in contact with a latch or pawl $e^{24}$, pivoted to stud $h^{24}$, and which is removed by the first forward movement of the tripping-piece $e^{17}$. With the first turning of the disk $e^{14}$ the pin $e^{16}$ pushes the trip-piece $e^{17}$ to the left off the end of stop $e^{24}$, thereby permitting a spring $e^{44}$ to draw said stop back in time to intercept its pin $e^{25}$. The shaft $e^{15}$ has its upper bearing in a bracket (not shown) from the rear of plate $a^{11}$ and its lower bearing in an angle-bracket $e^{38}$, extending down from plate $a^4$, Fig. 4. Each of the rock-shafts $e^6$ has near its right-hand end a rigid crank-arm $e^{31}$. These crank-arms are normally thrown against pins $e^{30}$ in a connecting-bar $e^{29}$, attached to right-hand end of a lever $e^{28}$, having a fulcrum $e^{32}$ extending down from the upper bed-plate $a^4$. With the first movement of the shaft $e^{15}$ the lever $e^{28}$, which rests against cam $e^{26}$ on said shaft, is permitted to be drawn backward. This allows the rock-shafts to turn, they being held constantly under tension by spring $e^{12}$ until their blades strike against the notches in the key-levers, as already stated. A cam $e^{27}$, acting through lever $e^{33}$, fulcrumed on angle-bracket $e^{38}$, and long connecting-pawl $e^{34}$, engaging rack $e^9$, feeds the slide-setting carriage one step or notch with each revolution of the shaft $e^{15}$. In order to prevent the slides $e$ being carried too far by their momentum as they are withdrawn, I provide each of the crank-arms $e^5$ with an S-shaped piece $e^{39}$, the upper end of which is held toward the pawl by a spring $e^{40}$. When standing in their normal positions, the lower ends of these pieces $e^{39}$ come in contact with the angle-pieces $e^{41}$, so as to give clearance to the lugs $e^{42}$. If the arms $e^5$ are drawn backward one step, the slides $e$ are moved up to the pieces $e^{39}$. If the slides $e$ are withdrawn more than one step, the pieces $e^{39}$ are carried backward with the slides; but the spring $e^{40}$ prevents the slides being carried backward farther than forced by the arms $e^5$. The movement of the carriage is given at two different points or times in the revolution of the shaft $e^{15}$. Just as the slides are drawn backward the arms $e^5$ are carried ahead enough for the pieces $e^{39}$ to clear the lugs $e^{42}$ and not draw the slides $e$ back with them, and when the arms are rocked forward to normal position the carriage is fed ahead, so as to inclose the lugs on the next set of slides $e$. The outside angle-pieces $e^{41}$ serve also as guides for the slide-setting carriage.

*Automatic spacing and justifying device.—* The form of justifier shown and described in the application for Letters Patent previously referred to (Serial No. 365,078) may be used to vary such of the stops $d$ of the dummy line as are used to effect the proper feed of the matrix material between words, thereby causing the mechanical line to control the matrix-making mechanism, so as to produce a justified-line matrix. The justifier therein described may be made to act directly on the stops $d$ or indirectly through their slides $e$, or the spacing-stops $d$ may be set by hand or in any other convenient manner to effect the same result; but I prefer to use a supplemental feeding device which is entirely independent of the matrix-feeding device. After the matrix-feeding device has been called into action to feed the matrix for normal spaces the supplemental feed acts, feeding the matrix forward or backward, if necessary to properly space or justify the line. This supplemental device or feed is controlled by the amount of line-space and the number of words (spaces between words) there are in the line, as will now be described. Referring to Fig. 4, the arm $c^{12}$, to which the gear $c^8$ is attached, rests normally upon an inclined surface $c^{13}$ from the sliding bar $c^{16}$. By moving the bar $c^{16}$ forward the gear $c^8$ will be raised and the matrix-holder moved thereby. By lowering the arm $c^{12}$, which is done by moving the bar $c^{16}$ forward with arm $c^{12}$ resting on the cam-surface $c^{14}$, located alongside of $c^{13}$, the matrix-holder will be moved in the opposite direction. I arrange to move the slide-bar $c^{16}$, with the arm $c^{12}$ resting on one or the other of these cam-surfaces, every time that the matrix-holder is fed to make a space between words, if it is necessary to add to or take from the normal spaces in order to properly space or justify the line. This I do in the following manner: Extending from the bed-plate $a^4$ to a bracket $a^{12}$ are two vertical guides $n^7$, between which, working in slots $n^{35}$, I place a ratchet-rack $n^8$, bearing a swinging arm $n^9$, held normally, as shown in Fig. 4, by the spring $n^{28}$. (See also Fig. 8.) This swinging bar comes in contact with the rear end of the sliding rod $c^{16}$ and pushes it forward as the ratchet-rack $n^8$ is raised. Every time that a space is reached on the traveling stops $d$ I arrange to have the die-holder moved, so that the upward forward rivet will be brought to the impression-point. When in this position, the pins $b^{14}$ in the slide-bar $b^7$ and frame $b^5$ will strike an equalizer $n^{24}$ on the end of a lever $n^{23}$, drawing up a connecting-rod $n^{22}$, which is attached at its lower end to an arm $n^{26}$ of a toggle-joint composed of arms $n^{27}$, thereby breaking the toggle, as shown in Fig. 8. If one of the parts $b^7$ or $b^5$ were drawn down to its lowest or tenth position and the other to its ninth position, the lever $n^{23}$ would be operated slightly; but the two dies of the holder which would be selected by these combinations are left out. With any other combination, if either of the parts $b^7$ or $b^5$ is drawn down ten points, the equalizer will be immediately restored by a spring $n^{25}$, and lever $n^{23}$ will not be moved thereby. A sliding piece $n^{29}$, bearing pawl $n^{30}$, follows the toggle down until arrested by its lower end (which projects to the left through a slot in one of the guides $n^7$) striking against a notched or stepped stop $n^{20}$. The position of this stop is controlled by the amount of line-space required by the dies, as will be explained later. The dies are cut on the well-known unit system of self-spacing type. As the die-holder returns to normal position a spring $n^{37}$ straightens the toggle, carrying the ratchet $n^8$ and the arm $n^9$ upward, provided the notched piece $n^{20}$ has permitted the pawl $n^{30}$ to lower. If the line is full, the notched piece $n^{20}$ will stand, so that its highest point will be directly under $n^{29}$, and the ratchet $n^8$ will not be moved at all, and nothing will be added to or subtracted from the movement of the matrix. If the line lacks any number of units—for example, five—the slide $n^{20}$ will be placed in such a position that the ratchet $n^8$ will be moved upward five notches every time that the space is reached. If there are three spaces in the line, five-thirds of a unit will be added to each space; if six spaces in the line, five-sixths of a unit will be added to the movement of the matrix-holder, in addition to the normal feed it would receive from the slide-bar $c$. It is therefore necessary to set the swinging piece $n^9$ in such a position that this may be accomplished. This is done by a cam-surface on the upper end of a bar $n^{10}$, which bar is fed upward every time the space-key $n^{14}$ is struck by a pawl $n^{12}$ on arm $n^{11}$ and retained in this position by a retaining-pawl $n^{13}$, attached to the vertically-movable frame containing the setting-slide. With the first automatic movement of the machine the frame rises and the swinging bar $n^9$ is cammed over by the bar $n^{10}$ striking a pin $n^{36}$ in said swinging bar and is held to the proper angle by a pawl $n^{16}$, according to the number of words there are in the line. The bar $n^{10}$ is really a registering device and records the number of spaces between words in the line. The shaft $e^6$, which controls the slides $e$ to set the forward row of stops $d$ for the proper spacing of the dies, has an arm $n$, bearing a pawl $n^2$, which operates a rack $n^3$, whereby every time a key is struck in the key-board the width of the corresponding die is registered by a pointer $n^5$ on a suitable scale $n^6$, attached to one of the bearings $a^6$ of the movement-shaft. The amount of space the dies would occupy in a line is therefore registered upon the scale as the keys are struck. As the frame containing the stepped setting-slides is moved upward a pawl $n^4$ on said frame carries the indicator or counting-rack $n^3$ upward with it, causing a pin $n^{38}$ in said rack to strike against a short rack $n^{17}$, which is supported by suitable bearings or clips on the side of a plate $n^{21}$, thereby moving forward through pinions $n^{18}$ and $n^{19}$ the notched piece $n^{20}$. A retaining-pawl $n^{39}$ holds the rack $n^{17}$ in the position set. If the indicated dies and normal spaces are just sufficient to fill up the line the notched piece $n^{20}$ will be in such a position that its highest point will come under the end of pawl-bearing piece $n^{29}$, as before stated. If there is not enough indicated space, the stop will be left so that the piece $n^{29}$ will drop down onto the notches on the front end of $n^{20}$ every time a set of space-stops $d$ is reached, moving the ratchet $n^8$ upward and adding the proper movement to the matrix-holder. If the amount of indicated space more than fills up the line, the notched piece $n^{20}$ will be pushed beyond its highest point and the sliding piece $n^{29}$ will strike on the notches on its rear end, and the ratchet $n^8$ will be moved upward the number of notches that the indicated line has units in excess; but as soon as the stepped piece $n^{20}$ reaches the point where the line is full its forward end hits the lower end of a lever $n^{40}$, causing cam-surface on its upper end to strike against the arm $n^{41}$, through which the bar $c^{16}$ passes, causing the shaft $c^{16}$ to rock, whereby the arm $c^{12}$, instead of being forced up the incline $c^{13}$, will follow down the incline $c^{14}$, and the normal feed of the matrix-holder will be reduced thereby.

*Automatic movements.*—I provide a movement-shaft $m$, mounted in suitable bearings $a^6$ and $a^7$, and a cross-movement shaft $m^2$, supported by bearings $a^2$. These shafts are made to turn together by a pair of miter-gears $m^3$. One revolution of these shafts produces all the movements necessary to raise the setting-slides, revolve the matrix-drum, throw the clutch $h^{11}$ in gear to operate the matrix-making mechanism already described, operate the casting mechanism, and restore such parts as have not been previously restored to their normal positions. The movement-shaft is actuated by throwing a gear $m^6$, near the right-hand end of said shaft, in mesh with a worm $m^5$, which is rigid with the power-shaft $h$. This is done by depressing the starting-key $m^7$, causing the rear end of its lever to push upward a fork $m^8$, thereby raising the end of the shaft and throwing the gear in mesh with the constantly-revolving worm. It is held in this position by a latch $m^{11}$, being drawn under one corner of the box $a^7$. The movement-shaft is jointed at $m^4$, and the box $a^7$ has a vertical movement in the box $h^2$, which permits of the raising and lowering of this end of the shaft. When the movement-shaft has made a complete revolution, a projecting cam or wedge surface $m^9$ strikes against a pin $m^{10}$ in the latch $m^{11}$, forcing it out and permitting the gear to drop, and thus stopping further movement of the shaft $m$. With the first movement of the shaft $m$ the frame containing the setting-slides is raised. This is done by rocking a shaft $m^{13}$, which extends between the bearings $a^6$, and having on each end forward projecting arms $m^{14}$, attached to the end pieces $e^3$ of said frame. The rear end of the left arm $m^{14}$ has a roll $m^{16}$ resting against a cam $m^{15}$ on the movement-shaft, and by means of which the shaft $m^{13}$ is actuated. As the frame $e^3$ moves upward a lever $m^{17}$, which has been resting against the lower rear rod $e^2$ of said frame, is drawn forward by a spring $m^{18}$. A releasing-rod $m^{19}$, attached to the lever, has a pin $m^{20}$, which strikes against the pawl $n^2$ of the indicator-rack, releasing it, and the forward end of said rod, supported from one of the boxes $e^7$, is turned upward, so as to strike against and release the stationary and actuating pawls of the setting-carriage, thus permitting said carriage to be drawn back to its normal position immediately. The carriage is drawn back by a weight attached to a cord $e^{36}$, which passes over a sheave $e^{37}$. Directly back of the slides $e$ is a shaft $m^{21}$, held in bearings from the rear plate $a^9$ and having a blade $m^{23}$. With the last upward movement of the slide-frame the right-hand end plate $e^3$ strikes against a pin in an arm $m^{26}$ on the shaft $m^{21}$, thereby throwing the blade $m^{23}$ forward, in which position it is held by a latch $m^{25}$. Fig. 5 shows the parts in this position. Attached to the plate $m^{23}$ is a strip $m^{24}$, which strikes against pawl $n^4$, releasing it and permitting the indicator-rack $n^3$ to return to its normal position, and the connecting-rod $n^{15}$, extending forward from the pawl $n^4$ to the pawls $n^{12}$ and $n^{13}$, releases them and permits the bar $n^{10}$ to drop. As the slide-frame is dropped back the slides $e$ are forced forward by the plate $m^{23}$ to their normal position, and just as the frame reaches its lowermost position the latch $m^{25}$ is lowered, permitting a retracting-spring $m^{22}$ to draw back the plate $m^{23}$, so that the slides $e$ may again be set. The lever $m^{17}$ is also forced back, permitting the pawls it has released to become active again. Meanwhile the matrix-drum $f^4$ has been given one-quarter of a turn in a manner to be described later. Just at this point the matrix-making mechanism is thrown in gear. This is done in the following manner: A pin $m^{12}$ in the movement-shaft strikes against the rear and inclined end of a long releasing-latch $s^{10}$, attached near its forward end to the upper arm of a bell-crank lever $s^9$ and supported near its rear end by a clip $s^{15}$ on the side of one of the vertical guide-pieces $n^7$. This raises a lug or catch $s^{12}$ and permits a spring $s^{14}$ to draw said latch backward. By this means a shaft $s^8$ on the top of cap-plate $a^8$, to which the bell-crank $s^9$ is attached, is rocked. Extending upward from the right-hand end of this shaft there is a fork $s^7$, inclosing the clutch $h^{11}$. As the latch $s^{10}$ is raised, the fork $s^7$ is drawn backward, closing the clutch $h^{11}$ and causing the cams on the power-shaft to revolve, bringing the dies to the impression-point, making the impression and feeding the traveling stops along, as already described. As the number of letters in a line varies, the number of stops $d$ which will be set will not be uniform. Sometimes but a single set or two will be needed. I have therefore arranged to have the matrix-making mechanism stopped as soon as all of the stops $d$ which have been set have been acted upon. This I do in the following manner: The front row of stops $d$ are used to effect the proper spacing. Those which are not called into action will be raised by their slides $e$ their greatest possible distance. Those which have been called into action will not be raised so high. On the top of the cap-plate $a^8$ is a long sliding bar $s$. The left end of it is turned upward and has three pins $s^3$, adapted to enter holes or openings in the lower ends of the bars $c\ b^7$ and arm of frame $b^5$. It has also a downward and rearward projecting leg $s^2$ coming in the path of the front row of stops $d$, and any of the stops $d$ which have been raised to their greatest height will strike against it, carrying it to the right and causing the pins $s^3$ to enter the holes in the pieces just referred to, thereby preventing their being drawn down again. The right-hand end of the bar $s$ is attached to a lever $s^4$, fulcrumed to a stud $h^{24}$ from bearing $h^3$ and controlling the movements of a pin or bolt $s^5$, being attached flexibly to it by a spring $s^6$. As the bar $s$ is carried to the right, the bolt is thrown to the left in front of an inclined surface $h^{25}$ on the clutch $h^{11}$, causing the clutch to open and stopping the matrix-making mechanism. As the clutch is thrown open, the shaft $s^8$ is rocked, drawing back the latch $s^{10}$ and holding the mechanism out of gear. As the shaft $s^8$ is rocked in this its reverse direction, the lower end of the bell-crank lever $s^9$ draws upward its downward-projecting hook $s^{16}$, thereby releasing stationary and actuating pawls $h^{15}$ and $h^{14}$. A weight (not shown) attached to a cord $s^{17}$, Fig. 3, passing over a sheave $s^{18}$, will immediately draw the dummy line of traveling stops back to its starting position. On the front end of the traveling-stop frame is an angle-piece $s^{19}$, which strikes against the bar $s$, withdrawing the pin $s^3$, and the upper end of this piece is drawn under the cushions $b^{16}$ at the same time, thereby preventing the pieces to which they are attached being drawn down, provided the matrix-making mechanism was stopped with the springs $b^{15}$ under tension.

The locking-plates $d^3$, previously referred to, have projections through the left end of the traveling-stop frame and are controlled by the bar $d^6$. As the carriage reaches its position farthest to the left an inclined surface on the rear end of the bar $d^6$ strikes against a post $d^8$ and cams said bar forward, allowing the stops $d$ to fall to their normal position. The post $d^8$ has a rearward-projecting pin $d^9$ through plate $a^{11}$, against which a pin $d^{10}$ in the left end piece $e^3$ of the slide-frame strikes as said frame is raised on starting the machine. This allows a spring $d^7$ to draw backward the bar $d^6$, carrying the locking-plates $d^3$ into the stops $d$. At the same time that the pawls holding the traveling stop-carriage are released the upper end of the bell-crank $s^9$ draws forward the latch $s^{10}$. The front end of this latch is bent, as shown in Fig. 4, and has a pin $s^{13}$, which extends through a slot in the cover $a^3$ and releases the pawls $c^{10}$ and $c^{11}$, allowing the spring $c^5$ to return the matrix-feeding rack $c^2$. A pivoted piece $s^{11}$ on the rear end of $s^{10}$ releases the two pawls $n^{30}$ and $n^{31}$, allowing the ratchet $n^8$ to drop, whereupon the pawl $n^{16}$ will strike the bed-plate $a^4$, releasing the swinging arm $n^9$, and the pawl $n^{39}$ will also be released, its forward end being carried down by the pawl $n^{16}$. This allows a weight $n^{42}$, attached to cord $n^{43}$ and passing over a sheave $n^{44}$ on $n^{21}$, to return the notched piece $n^{20}$. An angle-piece $n^{32}$ on the ratchet $n^8$ strikes against the piece $s^{11}$ just as said ratchet reaches its lowermost position, allowing the pawls $n^{30}$ and $n^{31}$ to become active immediately. As the frame $e^3$ is raised and the swinging arm $n^9$ and the notched piece $n^{20}$ are set the lower end of ratchet $n^8$ is raised slightly by said frame, thus allowing the pawls $n^{16}$ and $n^{39}$ to hold their respective parts in place. The pawls $n^{30}$ and $n^{31}$ will hold the ratchet upward, they having been released for this purpose, as just described.

*Matrix material and holder.*—The matrix material is in the form of narrow strips and is contained in a suitable magazine $f^7$, supported by bracket $f^8$ from the box $a$. With each revolution of movement-shaft $m^2$ a pair of eccentrics $m^{27}$ on said shaft draw down a pair of connecting-rods $m^{28}$, attached at their upper ends to a plunger $f^9$, thereby forcing one of the strips of matrix material into the holder $f^2$, which is under it at that time. In its upward movement the plunger $f^9$ strikes against angle-levers $f^{10}$, causing an ejecting-blade $f^{11}$ to push another strip of matrix material out of the magazine in under the plunger to be driven into the next matrix-holder by the next succeeding revolution of the shaft $m^2$. As a matrix material I prefer to use any suitable soft metal. Sheet-lead has proven to be the most desirable of anything I have tried. As the dies are driven in making the matrices, the material displaced has to go somewhere, and in order to prevent it being forced or carried backward toward the previous impression, thereby destroying or impairing it, I provide a matrix-holder with cut-away portions in the bottom of the slot or channel which contains the matrix material. A very desirable way of doing this is by cutting narrow slots lengthwise of the matrix-holding channel, as shown at $f^{12}$, Figs. 7 and 13. This affords an escape for the displaced matrix material, allowing the greater part of it to be driven directly in, and prevents the breaking down or destroying the walls of the previous impression. Fig. 15 is a view partially in section lengthwise, and Fig. 14 is a cross-section, of a strip of matrix material after the impressions have been made in it. The same result may be obtained by making perforations in the bottom of the channel, as shown in Fig. 17, or by milling it like a file, as shown in Fig. 16; or the same result may be obtained by supporting the matrix material on strips of metal or other material which are similarly recessed or cut away—such, for example, as wire-cloth. The main feature of this part of my invention is to provide a minimum amount of supporting-surface, thereby securing a maximum amount of space for the escape of the displaced matrix material. Immediately on starting the movement-shaft the matrix-carrying drum $f^4$ is given a quarter-turn in a manner to be described later. The matrix-holder in which the impressions were being made is fed from the right end of its slot $f^3$ in the drum toward the front. If the line is full, the feed-rack will bring it forward to the end of its slot. If only a partial line is made, as is frequently the case at the end of a paragraph, the matrix-holder will be carried forward to the end of its slot by the time it reaches the left side of the cylinder $f^5$, it being forced there by a pin $f^{13}$ in the holder striking against the cam-surface $f^{15}$ on the under side of the cylinder. The holder at the left of the cylinder, where the stereotype or cast is taken, is carried to the rear end of its slot in the drum by the time it reaches the right-hand side of the cylinder, where the matrix is made, by a spiral or cam slot $f^{14}$ in the upper surface of said cylinder. The cylinder $f^5$ is held in a fixed or rigid position and constitutes a solid impression bed or anvil to resist the impact of the die-impressing device and casting mechanism. It will of course be understood that the form of matrix-holder may be varied without departing from the spirit of my invention. The matrix-impressions might be made one line after another in a column-strip and the casting or stereotype made therefrom in the usual manner; but by holding the matrix material in single lines in the form of holder herein described and making the cast or stereotype of each line before it leaves the holder in which the impressions were made the matrix cannot be bent or distorted in any way by handling, and much better results can be obtained thereby.

*Casting or stereotyping mechanism.*—At the left of the matrix-carrying drum is a mold $g$, held in a horizontal frame $g^2$, which frame is supported by two legs $g^3$, Figs. 1, 2, and 5. Normally the mold stands as shown in Fig. 2. With the first movement of shaft $m$ it is drawn backward by a frame $g^4$, which encircles the mold just to the right of frame $g^2$. This frame is attached at its rear end to a projecting axle of two differential gears $g^6$ and $g^7$, which are held in a suitable frame $g^5$, supported by a bracket $g^{12}$ from the rear support $a^2$, the axles of the gears projecting through a slot $g^{19}$ in the guide $g^5$. $g^9$ is a stationary rack in mesh with $g^6$, and $g^8$ is a movable rack in mesh with $g^7$. With the first movement of the machine a cam $m^{29}$ on shaft $m$ allows the roll on bell-crank $g^{10}$ to be drawn backward by a spring $g^{11}$, attached to lower bell-crank arm, and through the parts just pointed out draws the mold to the rear, so that the mold-slot $g^{20}$ will be in alignment with the matrix, which is in the left-hand holder. Fig. 5 shows the parts in this position. A further movement of shaft $m^2$ draws up the melting-pot $g^{23}$. The pot is supported by two legs $g^{24}$, which permit it to rock slightly. The pot is drawn forward by a connecting-rod $g^{21}$, operated by a cam $g^{22}$ on shaft $m^2$. The nozzle of the melting-pot closes the left side of the mold and forces the mold tightly against the matrix material, thereby closing the right-hand side of the mold, the frame $g^2$ allowing the mold to swing to the right for this purpose. The pump $g^{27}$, which may be of any approved construction, is now operated by a spring $g^{29}$, acting through lever $g^{28}$ and connecting-rod $g^{26}$. A cam $m^{30}$ on left end of shaft $m$ permits the spring to become active. The position of lever $g^{28}$ is shown by dotted line in Fig. 5. The pump forces the molten metal from the pot $g^{23}$ into the mold $g$, making a stereotype of the line-matrix against which the mold is resting. The metal may be kept hot by a gas-jet supplied from pipe $g^{25}$. The cam $g^{22}$ permits the melting-pot to retreat, and a spring $g^{48}$ draws back the frame $d^2$, whereupon the cam $m^{29}$ forces forward the lever $g^{10}$, carrying the mold forward, the left edge or bottom of the cast line being shaved by a knife $g^{30}$. When it reaches its forward position, an ejector $g^{13}$, guided in bearings $g^{14}$ and operated through connecting-rod $g^{16}$ by cam $g^{17}$ on the forward end of shaft $m^2$, forces the stereotype out into a suitable galley $g^{31}$. Several of these line-stereotypes are shown at $g^{32}$ in Fig. 1. A simple escapement, composed of rack $g^{36}$ and pawls $g^{33}$ and $g^{34}$, permits a movable head $g^{35}$ to lower the width of one of the stereotypes every time a line is cast. The escapement is operated by a stud $g^{39}$ in lever $g^{15}$ through connecting-rod $g^{38}$ and arm $g^{37}$. With the forward movement of the mold-moving frame $g^4$ a plow $f^{16}$ on the end of a rack $f^{17}$, attached to said frame, removes the matrix material from the holder where the cast has just been taken. The rack $f^{17}$ is in mesh with a gear $f^{18}$, loose on a stud $f^{19}$, which extends to the left from rear support $a^2$. Also loose on the same stud is a bevel-pinion $f^{21}$, in mesh with a bevel-gear $f^{22}$, attached to the matrix-carrying drum. The bevel-pinion is connected to and made to turn with a ratchet-wheel $f^{20}$. The gear $f^{18}$ has a pawl $f^{23}$ to operate or turn ratchet-wheel $f^{20}$. As the frame $e^4$ is drawn forward the pawl $f^{23}$ slips in the ratchet-teeth; but as the frame is carried backward, which is done with the first movement of the shaft $m$, the pawl catches in the ratchet-teeth, causing the bevel-pinion $f^{21}$ to revolve, thereby giving the matrix-carrying drum a quarter-turn.

The operation of the machine as a whole may be briefly reviewed as follows: The operator writes the matter upon the machine the same as on an ordinary type-writer. With each stroke of a key a set of primary slides is set and the amount of space the characters will occupy in the line is registered, so that the operator may know when enough characters have been indicated to make up a line. The number of spaces between words is also registered. The starting-key is then touched, thereby raising the frame containing the primary setting-slides and transferring their settings to the mechanical or dummy line, and also setting the parts of the justifying or spacing mechanism so that when called into action between words the matrix-feed may be increased or diminished, if necessary, to properly space or justify the line. The matrix-drum is revolved at the same time, changing the matrix-holders. The frame of primary setting-slides and other parts which have been set are restored at once to normal position, as described, when the operator can immediately work the bank of keys to select or set up the next line. At this point the matrix-making mechanism is automatically thrown in gear with the constantly-running power-shaft, thereby bringing the dies to the impression-point, making the impressions in their order, as controlled by the stops in the dummy or mechanical line. As soon as all the stops of the dummy line which have been set have been acted upon the matrix-making mechanism is thrown out of gear and its parts restored to normal position, ready to receive the settings of the next line on again starting the movement-shaft. At the same instant the matrix-making mechanism is thrown in gear, the casting mechanism operated, making and discharging the stereotype, as described, and as soon as that is done the movement-shaft, having made one complete revolution, throws itself out of gear. Of course it will be readily seen that two blank slugs will be cast on starting the machine. It will also be understood that many modifications in the arrangement of the parts might be made without departing from the general principles of my invention. For example, instead of employing a single dummy line and a set of primary setting-slides, two dummy lines might be employed, one of which is being operated upon by the bank of keys while the other is controlling the matrix-making mechanism. It will of course be understood that the dummy or mechanical line herein shown and described as selecting matrix-making dies is capable of other similar uses—such, for example, as controlling the selection of type-writer dies printing by direct impression—or it might be used to release or control the release of either male or female dies from magazines or other holders. It will also be understood that the terms "setting-slide" or "setting-slides," as used in this specification and claims, is synonymous with the words "setting-piece" or "setting-pieces," indicating the movable parts e set directly from the keys. It should be further noted that the so-called "setting-slides," taken collectively, and the mechanical or dummy line in reality constitute two sets of die-selecting devices arrangeable for an entire line of dies, which, in cooperation with the bank of keys, permits one set to be used for controlling the matrix-making mechanism or selection of the dies for a given line while the other set is being arranged for the next succeeding line.

What I claim, and desire to secure by Letters Patent of the United States, is—

1. The combination, with matrix-making mechanism, of a dummy or mechanical line for controlling the same, consisting of a series of independently-movable parts prearrangeable with reference to each other at the indication of the characters and normal spaces of the selected line and which subsequently come into effect to select and space the dies to produce a line of impressions.

2. The combination, with matrix-making mechanism, of keys for indicating the characters and normal spaces, and a dummy or mechanical line composed of independently-movable pieces, which are first set from the keys for the entire selected line and then subsequently come into effect to control the matrix-making mechanism.

3. The combination, with keys for indicating the characters and normal spaces, of a primary series of setting-slides set by the keys as the characters and normal spaces are indicated, and a dummy or mechanical line composed of a series of independently-movable parts set by said primary setting-slides.

4. The combination, with keys for indicating the characters and normal spaces, of a primary series of setting-slides set by the keys as the characters and normal spaces are indicated, a dummy or mechanical line composed of a series of independently-movable parts set by said primary setting-slides, and a matrix-making mechanism controlled by said dummy or mechanical line, substantially as described.

5. The combination, with a matrix-making mechanism, of a dummy or mechanical line for controlling the same, consisting of a series of independently-movable pieces mounted in a bodily-movable support, a primary series of setting-slides mounted in a bodily-movable support for setting the parts of the mechanical line, and a bank of keys for setting said primary slides, the relative arrangement being such that the slides may be set for the second line while the dummy is controlling the matrix-making mechanism to produce a matrix of the first line, substantially as described.

6. In a matrix-making machine, the combination, with a matrix-feeding device, of letter-space and word-registering devices, and a supplemental matrix-feeding device controlled from the registering devices to vary the space-feed between words so as to justify the line.

7. In a matrix-making machine, the combination, with indicating-keys, of a matrix-feeding device, letter-space and word-registering devices controlled from the keys, and a supplemental matrix-feeding device controlled from said registering devices to vary the space-feed between words, so as to justify the line.

8. The combination, with indicating-keys, of character-dies and a matrix-material-feeding device, a mechanical line composed of movable pieces arrangeable from the keys for controlling the selection of the character-dies and the normal feed of the matrix, line-space and word-registering devices controlled from the keys, and a supplemental matrix-feed device controlled from the registering devices to vary the space-feed between words to justify the line.

9. The combination, with a movable dummy or mechanical line consisting of a series of independently-movable pieces prearrangeable with reference to each other for the entire line, of movable dies alignable at a common point of impression by said dummy line, substantially as described.

10. The combination, with the die-holder and open oblong frames embracing the same, movable in two different directions, of an actuating device normally adapted at each stroke to move said frames to their limit, springs for yieldingly supporting said frames, and a movable mechanical line consisting of a series of sets of independently-movable stops previously set for the entire line, adapted to be brought into effect in succession to arrest said frames in the proper positions to align the selected dies at the impression-point.

11. The combination, with a yieldingly-supported die-carrier movable to align the dies at a common point, of an actuating device adapted to move the carrier to its limit at every action and a series of stops for arresting the carrier against its yielding support in different positions to align the proper dies.

12. The combination, with the die-holder, of the oblong open frames embracing the holder and movable in different directions to align the dies of the stop-legs or projections on said frame, a space-feeding bar, and a movable mechanical line consisting of a series of sets of movable stops previously arrangeable for the entire selected line, the sets of which are adapted to be brought into effect in succession to co-operate with said stop-legs and spacing-bar to align the dies and effect the matrix-material feed, substantially as described.

13. The combination, with the die-carrier and primary aligning devices for approximately aligning the dies in succession at a common point, of a final or supplemental aligning device consisting of a toggle lever or levers brought into effect to finally and accurately align the dies.

14. The combination, with the die-holder and the frames $b^5$ and $b^6$, of the bar $b^{10}$, having the arm $b^{12}$, the rock-shaft $b^{18}$, provided with a crank-arm and depending leg $b^{20}$, movable by the arm $b^{12}$ at the extremity of its movement, and the toggle-levers $b^{19}$, engageable with said frames for effecting the final alignment of the dies, substantially as described.

15. The combination, with a die-impressing device and a casting device, of a movable matrix-material holder alignable in succession with the impressing device and the casting device without disturbing the matrix material.

16. The combination, with a die-impressing device and a casting device, of a series of two or more movable matrix-material holders alignable in succession with the impressing device and the casting device without disturbing the matrix material, whereby the casting from one matrix and the formation of another matrix may be in progress at the same time.

17. The combination, with a die-impressing device and a casting device, of a series of three or more matrix-holders alignable in succession with the impressing device and the casting device without disturbing the matrix material, whereby at the same time one holder may be in position to receive the impression, another to receive the cast, and the third to receive a new strip of matrix material.

18. The combination, with a die-impressing device and a casting device, of a matrix-material magazine having an automatic forced feed, and a series of independent matrix-holders for the strips of matrix material alignable in succession with the magazine to receive a new strip of material, with the impressing device to receive the impression from the dies, and with the casting device to receive the cast from the same, substantially as set forth.

19. The combination, with a die-impressing device, of a casting device, a series of matrix-material holders, and a common support for said holders, movable in a continuous direction to align the holders in succession with the impressing and casting devices, substantially as described.

20. The combination, with a die-impressing device and a casting device, of a matrix-material magazine having a forced feed, a drum movable in a continuous direction, and a series of matrix-holders mounted on the drum and alignable thereby in succession with the magazine, the impressing device, and the casting device.

21. The combination, with a die-impressing device and a casting device, of a fixed cylinder constituting the impression bed or anvil to resist the impact from the impressing and casting devices, a drum closely fitting said cylinder and revoluble thereon, and matrix-holders mounted on the drum and alignable thereby with the impressing and casting devices, substantially as described.

22. The combination, with a die-impressing device and a casting device located out of line with each other, of a fixed cylinder between the two constituting the impression and the casting bed, provided with a spiral groove on its periphery, a drum fitting said cylinder and revoluble thereon, and a matrix-holder working in a groove of said drum engageable with said spiral cam and spiral groove to insure the proper lateral movement of the holder to align the matrix material with the impressing and casting devices.

23. The combination, with a matrix-making mechanism, of a dummy or mechanical line for controlling the same, consisting of a series of movable parts sufficient for any desired line, more or less of which parts are prearranged with reference to each other for the selected line, and means for stopping the matrix-making mechanism whenever the prearranged parts have done their work.

24. The combination, with the friction-disk $e^{14}$, provided with the pins $e^{16}$ and $e^{25}$, of the trip-lever $e^{17}$ and the pivoted stop-lever $e^{24}$, substantially as and for the purpose set forth.

25. The combination, with slides provided with lugs, of rock-shafts provided with crank-arms engageable with said lugs to move the slides, and a pivoted S-shaped piece carried by the shaft or crank-arm and held under tension to move toward the crank-arm for preventing the movement of the slide by momentum.

26. The combination, with slides provided with lugs, of rock-shafts provided with crank-arms engageable with the lugs to move the slides, pivoted S-shaped pieces carried by the shaft or crank under tension to move toward the cranks for engaging the opposite sides of the lugs and limiting the movement of the slides, and a stop for holding the pivoted piece sufficiently far from the crank to permit the lugs to enter between the cranks and pivoted pieces, substantially as described.

27. The combination, with the setting-slides arranged in sets provided with lugs, of the rock-shafts, sliding crank-arms, and retaining devices for engaging said lugs to set said slides, and a feeding device for moving said crank-arms and retaining devices from one set of slides to another by two distinct steps, substantially as and for the purpose set forth.

28. The combination, with the setting-slides $e$, provided with the lugs $e^{42}$, of the rock-shafts, each provided with crank-arms $e^5$, the pivoted S-shaped pieces $e^{39}$, carried by the shafts, the tension-spring $e^{40}$, and the stop-pieces $e^{41}$, substantially as and for the purpose set forth.

29. A matrix-material holder or impression-bed provided with meshes or recesses to permit and receive the escape of material displaced by the dies as the impression is made, substantially as and for the purpose set forth.

30. The combination, with a die-carrier movable to align the desired die at the impression-point, of actuating devices for moving the carrier, stops for arresting the carrier's movement to align the desired die, and means for affording yielding contact between the stops and the carrier, substantially as described.

31. The combination, for selecting dies, of a bank of keys and two sets of die-selecting devices, each of which consists of a series of independently-movable pieces prearrangeable with reference to each other for an entire line of dies, whereby one set of the said die-selecting devices may be in use to automatically control the selection of a given line of dies while the other set is being arranged from the keys for the selection of the dies of the next succeeding line.

32. The combination, with an impression-material-feeding device, of movable dies alignable for impression on said material, and a dummy or mechanical line for automatically controlling the selection and the spacing of the dies, the same consisting of a series of independently-movable pieces prearrangeable with reference to each other for the entire line and working in sets of three pieces, two pieces of each set being used for selecting any given die and the third for controlling the feeding device to properly space the impression, substantially as described.

33. In combination for selecting dies, a bank of keys and two sets of die-selecting devices arrangeable for an entire line of dies, whereby one set of said devices may be in use to select a given line of dies while the other set is being arranged for the next succeeding line, substantially as described.

In testimony whereof I affix my signature in presence of two witnesses.

FRANK AMOS JOHNSON.

Witnesses:
 A. U. OPSAHL,
 E. F. ELMORE.